Oct. 27, 1931.  C. W. LARNER  1,829,703
VALVE
Original Filed July 22, 1919
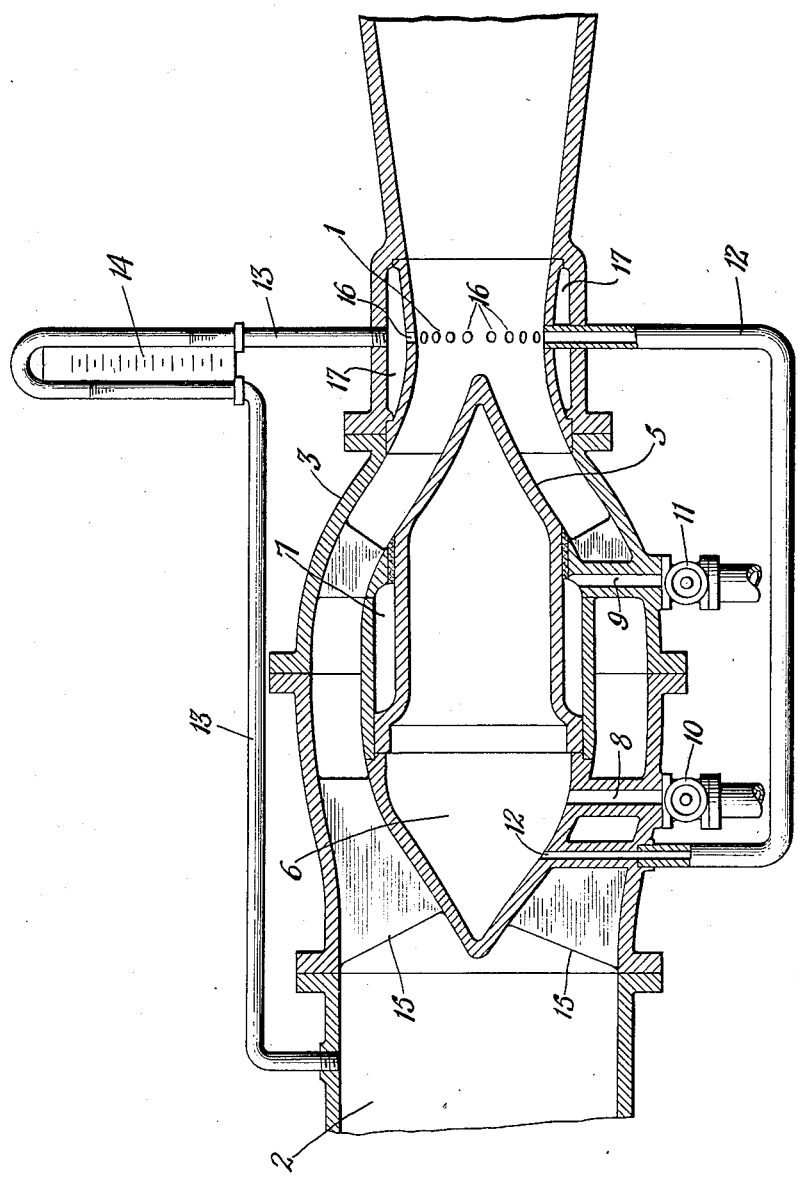
INVENTOR
Chester W. Larner
BY
Edwards, Sager & Bowen
ATTORNEYS Patented Oct. 27, 1931

1,829,703

UNITED STATES PATENT OFFICE

CHESTER W. LARNER, OF PHILADELPHIA, PENNSYLVANIA

VALVE

Original application filed July 22, 1919, Serial No. 312,559. Divided and this application filed March 17, 1925. Serial No. 16,109.

In filtration plants and other hydraulic works where Venturi meters are used for measuring the flow of water in pipe lines, some form of stop valve is generally provided in addition to the meter for shutting off the flow. The principal object of this invention is to provide a structure in which the valve and Venturi meter are combined in a single structure, thus economizing in both cost of apparatus and space occupied.

The invention will be claimed at the end hereof but will be first described in connection with the embodiment of it selected for illustration in the accompanying drawings forming part hereof and in which there is illustrated principally in central section a valve embodying features of the invention.

Referring to the drawings, there is a Venturi tube having a throat 1, formed and proportioned in respect to the inlet portion 2, for measurement of velocity; that is to say, the area of the opening at the throat portion 1, is small in comparison with the area of the opening at the inlet portion 2. For accurate readings the velocity at 1, should be from four to nine times as high as at 2. It may be noted that the velocity at 1, is high and the static pressure low in comparison with the pressure at all other points, and this fact will be hereinafter referred to. The Venturi tube has its inlet and contracting portion 3, arranged to form a valve body. 4 and 5, are fixed and movable plunger valve elements spaced from the inner wall of the valve body and having between them a cylindrical chamber 6, and an annular chamber 7. This structure constitutes a type of differential plunger valve. 8 and 9, are normally closed or inoperative chamber connections or ports for seating and unseating the movable plunger element 5, in respect to the valve body 3. The main valve 5, is operated by control valves 10 and 11, for example, in either of two ways. Ports or connections 8 and 9, are either connected to a drain or otherwise discharge against atmospheric pressure; or they are connected to an independent pressure system carrying a pressure higher than that in the main valve. In the first case the plunger 5, is moved to open position by exhausting the chamber 6, through port 8, and is closed by exhausting chamber 7, through port 9. In the second case the plunger is moved to open position by admitting higher pressure to chamber 7, through port 9, and is closed by admitting higher pressure to chamber 6, through port 8. The valves 10 and 11, are normally closed, and they are alternately opened to move the plunger, but as soon as the plunger has completed its stroke they are closed. It has been said that the velocity at the throat 1, is relatively high for accuracy of measurement and that the pressure is relatively low or a minimum. So that the nose of the plunger 5, when the main valve is open, is exposed to relatively low pressure and if the pressure at the nose of the plunger element is lower than the pressure in the chamber 6, the plunger will move into closed position and interrupt the measuring operation of the Venturi tube by stopping flow through it. To avoid this a connection as 12, is provided from the chamber 6, to the throat of the venturi. This connection or port 12, is smaller than the connection or port 8, in order to permit of the described operation of moving the plunger 5. 13, is a connection extending from the throat 1, to the inlet 2, and including a gauge 14, by reference to which the flow past the valve and through the venturi is ascertained as will be readily understood by those skilled in the art.

The throat 1, is the point of maximum velocity and therefore of minimum pressure, and since the throat and chamber 6, are connected, the pressure on the nose of the plunger 5, when in open position, must be greater than the pressure in the chamber 6, and hence accidental closing of the plunger is avoided and made impossible. 15, are ribs for supporting the fixed plunger element 4, and 16, are holes through which pressure is imparted from the throat 1, to the chamber 17, with which the pipe connection 13, communicates.

The mode of operation of the invention, briefly stated, is that the valve body constitutes an element of the Venturi tube and so co-operates with both the valve and venturi for the accomplishment of the objects stated.

The operation of the valve and Venturi meter are believed to be well understood.

It will be obvious to those skilled in the art to which the invention relates that modifications may be made in details of construction and arrangement without departing from the spirit of the invention, hence the latter is not limited to such matters or otherwise than as the prior art and the appended claims may require.

I claim:

1. In combination with a conduit, a valve comprising a casing, a hollow member within the casing having a plunger, means for shifting said plunger to open and close the valve, and means adapted when in open position to prevent creeping of the valve in a closing direction, said means extending to the exterior of the valve for maintaining within said hollow member substantially the same pressure that exists on the nose of the plunger.

2. In combination with a conduit and a valve therein comprising an outer casing and an inner hollow member with a movable part constituting a plunger, of means extending to the exterior of the casing for maintaining substantially the same pressure in said hollow member as exists on the nose of the plunger, and means for opening and closing the valve, including means forming a fluid pressure surface whose transverse area is in addition to the transverse area enclosed by the cylindrical body portion of said plunger.

3. In combination with a conduit, a valve therein comprising a casing, an inner hollow member having a stationary part and a movable part constituting a plunger adapted to be shifted to open and close the valve, means for opening and closing the valve, and an equalizing pipe communicating with the interior of said hollow member through the stationary part thereof and with a point in the waterline outside said hollow member so as to maintain within said member substantially the same pressure as exists on the nose of the plunger.

4. In combination with a conduit through which a fluid is adapted to be conducted, of a valve in the conduit comprising a casing having a seat, a hollow member within the casing having a plunger adapted to be moved to and from the seat to close and open the valve, pressure operated means to open and close the valve, and means operable to transmit pressure variations to or from the interior of said plunger independent of movement of said pressure operated means, said means extending to the exterior of the casing for maintaining substantially the same pressure within said hollow member and on the inner side of the plunger as exists at a definite point in the water line adjacent the seat.

5. In combination with a conduit through which a fluid is adapted to be conveyed, of a valve in the conduit comprising a casing having a seat, a hollow member supported within the casing and having a movable part in the form of a plunger adapted to be shifted to and from the seat to close and open the valve, means for moving said plunger to open and closed positions by fluid pressure including an internal plunger chamber in which fluid pressure is exerted on said plunger in a closing direction and means forming another chamber in which fluid pressure is adapted to effect opening movement of the plunger, and a stationary passageway communicating at one end with said internal chamber, and communicating at its other end with the waterway by which the pressure on the outer end of the plunger is maintained on the inner side of the hollow member.

6. In combination with a conduit through which a fluid is adapted to be conveyed, of a valve in the conduit comprising a casing having a seat, an inner hollow member with a movable part in the form of a plunger adapted to be moved to and from the seat, said plunger having its downstream face entirely closed, means for shifting the plunger to open and close the valve, and an equalizing pipe extending between said hollow member and a point in the water line beyond the seat, whereby the pressure on the nose of the plunger is communicated to the interior of said hollow member.

7. The combination with a conduit, of a valve comprising a casing, a hollow member within the casing having a cooperating plunger, means for shifting said plunger to open and close the valve, and means extending to the exterior of the valve whereby substantially the same pressure that exists in the waterway adjacent the plunger may be had within said hollow member.

8. The combination with a conduit, of a valve comprising a casing, a hollow member within the casing having a cooperating plunger, means for shifting said plunger to open and close the valve, and means extending to the exterior of the valve whereby substantially the same pressure that exists in the waterway adjacent the plunger may be had within said hollow member, while said plunger is being moved in an opening direction.

9. The combination with a conduit, of a valve comprising a casing, a hollow member within the casing having a plunger provided with a closed nose, means for shifting said plunger to open and close the valve, and means whereby substantially the same pressure that exists near the plunger nose may be had within said hollow member.

10. The combination with a conduit, of a valve comprising a casing, a hollow member within the casing having a plunger provided with a closed nose, means for shifting said plunger to open and close the valve, and means whereby substantially the same pressure that exists near the plunger nose may be had within said hollow member when said plunger is stationary.

11. The combination with a conduit, of a valve therein comprising an outer casing and an inner hollow member with a movable part constituting a plunger, and means extending to the exterior of the casing whereby substantially the same pressure may be had in said hollow member as exists near the nose of the plunger.

12. The combination with a conduit, of a valve therein comprising an outer casing and an inner hollow member with a movable part constituting a plunger, means extending to the exterior of the casing whereby substantially the same pressure may be had in said hollow member as exists near the nose of the plunger and operating means for controlling plunger movement including a fluid pressure chamber adapted to receive fluid pressure and maintain the same substantially separated from fluid pressure within the hollow member.

13. The combination with a conduit, of a valve therein comprising an outer casing and an inner hollow member with a movable part constituting a plunger, means extending to the exterior of the casing whereby substantially the same pressure may be had in said hollow member as exists near the nose of the plunger, and operating means for controlling plunger movement including a fluid pressure chamber adapted to receive fluid pressure and maintain the same substantially separated from fluid pressure within the hollow member, said chamber being so disposed whereby its volume is contracted during plunger closure and is expanded during plunger opening movement.

14. In a valve of the plunger type, an outer casing, an inner valve member supported centrally therein and composed of a fixed part and a plunger slidingly engaging the same, said plunger having provision for presenting an interior fluid chamber which when the plunger is in closed position is prevented from having communication with the fluid way through the plunger, means for opening and closing the valve, and means for maintaining in said inner member substantially the same pressure that exists on the nose of the plunger comprising an equalizing pipe connected at one end to the water line, and at the other end to a space within said inner valve member, and at least one of said points of connection being below the center line of the valve.

15. In a valve of the plunger type, an outer casing, an inner valve member supported centrally therein and composed of a fixed part and a closed nose plunger slidingly engaging the same, means for opening and closing the valve, and means for maintaining in said inner member substantially the same pressure that exists on the nose of the plunger comprising an equalizing pipe connected at one end to the water line, and at the other end to a space within said inner valve member, both said points of connection being below the center line of the valve.

16. A hydraulic valve of the plunger type composed of an outer casing, an inner valve member supported centrally therein and composed of a stationary part and a closed nose plunger slidingly engaging the same, means for operating the valve, the plunger having a seating portion adapted to engage a seating portion of the casing, and a pressure equalizing pipe communicating with the lower part of the inner valve member and communicating with the lower part of one end portion of the casing adjacent said seating portion thereof.

17. In combination with a conduit, a valve comprising a casing, a hollow member within the casing having a plunger, means for shifting said plunger to open and close the valve, and means extending to the exterior of the valve for maintaining within said hollow member substantially the same pressure that exists on the nose of the plunger.

18. In combination with a conduit through which fluid is adapted to be conducted, of a valve in the conduit comprising a casing having a seat, a hollow member within the casing having a plunger adapted to be moved to and from the seat to close and open the valve, pressure operating means to open and close the valve, and means extending to the exterior of the casing for maintaining substantially the same pressure within said hollow member and on the inner side of the plunger as exists at a definite point in the waterline adjacent the seat.

19. In combination with a conduit through which a fluid is adapted to be conveyed, of a valve in the conduit comprising a casing having a seat, an inner hollow member with a movable part in the form of a plunger adapted to be moved to and from the seat, means for shifting the plunger to open and close the valve including fluid pressure surfaces whose area is in addition to the transverse area enclosed by the cylindrical body portion of said plunger, and an equalizing pipe extending between the interior of said hollow member and a point in the waterline beyond the seat, whereby the pressure on the nose of the plunger is communicated to the interior of said hollow member, said pipe and plunger being adapted to have relative movement between each other.

20. In combination with a conduit, a valve comprising inner and outer casings spaced to form a fluid passageway therebetween, a plunger operatively associated with said inner casing to form an interior fluid chamber, and a plunger seat associated with said outer casing, whereby said plunger may move so as to control fluid flow through said passageway, and a pipe extending to the exterior of said outer casing and connecting said interior chamber with said conduit adjacent to but on the downstream side of said plunger seat and arranged to substantially equalize the pressures within said interior chamber and the downstream pipe during flow therethrough.

21. The combination with a conduit, of a valve comprising an outer cylindrical casing having an inlet and outlet, the cross-sectional area of the outlet being materially smaller than the inlet, a hollow fixed inner casing disposed within said outer casing and spaced therefrom to provide a relatively smooth annular fluid passageway, a plunger telescopically arranged with said inner hollow casing and provided with a closed nose adapted to engage the reduced outlet of said outer casing, means including said inner casing and plunger for providing fluid pressure operating chambers whereby said plunger may be shifted to open and closed positions, and means extending to the exterior of said inner casing providing a fluid pressure connection from the interior thereof to a point adjacent the reduced outlet of said outer casing whereby substantially the same pressure that exists near the plunger nose may be had within said inner hollow casing during at least certain positions or operations of the plunger.

CHESTER W. LARNER.